(12) United States Patent
Si et al.

(10) Patent No.: US 7,366,926 B2
(45) Date of Patent: Apr. 29, 2008

(54) ON-CHIP SUPPLY REGULATORS

(75) Inventors: Xiaomin Si, San Jose, CA (US);
Howard Yang, Shanghai (CN);
Stephen Tai, Shanghai (CN)

(73) Assignee: Montage Technology Group Limited, George Town, Grand Cayman (KY)

( * ) Notice: Subject to any disclaimer, the term of this patent is extended or adjusted under 35 U.S.C. 154(b) by 93 days.

(21) Appl. No.: 11/423,869

(22) Filed: Jun. 13, 2006

(65) Prior Publication Data

US 2007/0285122 A1    Dec. 13, 2007

(51) Int. Cl.
*G06F 1/00* (2006.01)
(52) U.S. Cl. ....................... 713/300; 323/318
(58) Field of Classification Search ............. 713/300, 713/330, 340; 323/234, 318
See application file for complete search history.

(56) References Cited

U.S. PATENT DOCUMENTS

| | | | |
|---|---|---|---|
| 4,042,830 A | | 8/1977 | Kellenbenz et al. |
| 5,301,161 A | * | 4/1994 | Landgraf et al. ...... 365/185.04 |
| 5,323,066 A | * | 6/1994 | Feddeler et al. ............ 327/142 |
| 5,912,855 A | * | 6/1999 | McLaury .................... 365/226 |
| 6,882,373 B2 | | 4/2005 | Hong et al. |
| 7,012,464 B2 | | 3/2006 | Singor et al. |
| 2002/0065059 A1 | | 5/2002 | Yasuda |
| 2003/0197810 A1 | | 10/2003 | Jaffe |
| 2005/0280742 A1 | | 12/2005 | Jaffe |

OTHER PUBLICATIONS

Data Sheet of Philps TDA10021HT DVB-C Channel Receiver, Oct. 1, 2001.
Data Sheet of Zarlink ZL10210 DVB-C Cable Channel Demodulator, (Nov. 2005).

* cited by examiner

*Primary Examiner*—Don Le
(74) *Attorney, Agent, or Firm*—Ivy Y Mei

(57) ABSTRACT

Integrated circuit chips with on-chip supply regulators with programmability and initialization. In one embodiment, an integrated circuit, includes: an initialization circuit to assert an initialization signal during powering up of the integrated circuit; a control circuit coupled to the initialization circuit; and a power supply regulator coupled to the control circuit, the power supply regulator to provide a first voltage to the control circuit when the initialization signal is asserted, the power supply regulator to provide a second voltage to the control circuit according to a control signal from the control circuit when the initialization signal is not asserted. In one embodiment, the integrated circuit includes a digital television demodulator.

20 Claims, 4 Drawing Sheets

ON-CHIP SUPPLY REGULATORS

FIELD OF THE TECHNOLOGY

At least some embodiments of the invention relate to supply regulators in general, and more specifically but not exclusively to supply regulators integrated on integrated circuit chips.

BACKGROUND

Integrate circuits may integrate different types of circuits on a single chip to increase integration level. For example, an integrated circuit chip may include integrated analog circuit, digital circuit, memory, and/or input output (IO) circuit, etc.

Different types of integrated circuits may use different supply voltages. Thus, an integrated circuit chip may need different supply voltages for different parts of the chip.

For example, it may be preferred to use low supply voltage for internal digital cores of integrated circuits. Short channel length can be used to reduce die size and/or to increase the speed. Associated with the use of short channel length is the thin gate oxide thickness, which requires low power supply voltages. Thus, a digital circuit on the integrated circuit may need a voltage lower than an analog circuit implemented on the same integrated circuit.

Further, the power consumption of the digital circuits implemented in complementary metal oxide semiconductor (CMOS) logic is approximately proportional to the square of its supply voltages. Low supply voltage can be used to reduce power consumption of the integrated digital circuits.

Input output (IO) circuits and analog circuits may run at a supply voltage different from that of the integrated digital core of an integrated circuit chip. Input output (IO) circuits and analog circuits may be required to interface directly with signals coming to or going out of the integrated circuit chip. The signals off the integrated circuit chip may have different common-mode voltages, large voltage swing, etc. Typically, input output (IO) circuits and analog circuits run at higher supply voltages than integrated digital circuit core of an integrated circuit.

To meet the requirement of multiple supplies for an integrated circuit, off-chip supply regulators are typically used to provide different power voltages for the integrated circuit. Philips TDA10023 (Philips Semiconductor, TDA10023 www.philips.com) is such an example. Another example is Zarlink ZL10210, the Datasheet released 2005.

SUMMARY OF THE DESCRIPTION

Integrated circuit chips with on-chip supply regulators with programmability and initialization are described herein.

According to one embodiment of the present invention, an integrated circuit, includes an initialization circuit to assert an initialization signal during powering up of the integrated circuit; a control circuit coupled to the initialization circuit; and a power supply regulator coupled to the control circuit, the power supply regulator to provide a first voltage to the control circuit (and digital core in one embodiment) when the initialization signal is asserted, the power supply regulator to provide a second voltage to the control circuit (and digital core) according to a control signal from the control circuit when the initialization signal is not asserted.

According to one embodiment of the present invention, the integrated circuit is implemented on a single chip and may further include a digital television demodulator. The digital television demodulator comprises a digital circuit and an analog circuit. The digital circuit is implemented using complementary metal oxide semiconductor (CMOS) logic. The power supply regulator provides one voltage to the digital circuit and one voltage to the analog circuit. The voltage to the digital circuit is usually lower than the voltage to the analog circuit. The voltage to the digital circuit is adjustable according to a control signal from the control circuit, which is a digital circuit itself in one embodiment.

According to one embodiment of the present invention, when the initialization signal is not asserted, the power supply regulator changes its voltage for the digital circuit from the first voltage to the second voltage.

According to one embodiment of the present invention, the power supply regulator comprises a load simulator; a master driver to provide a voltage to the load simulator; a comparator to generate a control signal based on a difference between a reference voltage and the voltage to the load simulator, wherein the reference voltage is under the control of the control logic; a slave driver to provide an output voltage; wherein the control signal from the comparator controls the master driver and the slave driver. The load simulator comprises at least one digital gate. The reference voltage is generated on the integrated circuit.

According to one embodiment of the present invention, an integrated circuit, includes means for asserting an initialization signal during powering up of the integrated circuit; means for generating a control signal; means for providing a first voltage to generate the control signal when the initialization signal is asserted and providing a second voltage according to the control signal when the initialization signal is not asserted. The integrated circuit is implemented on a single chip; and the control signal is programmable to adjust a voltage provided to generate the control signal.

According to one embodiment of the present invention, the integrated circuit, further includes means for reducing a variation of a voltage to a digital circuit on the integrate circuit and a voltage to an analog circuit on the integration circuit. The analog circuit includes a gain amplifier, Analog to Digital Converter (ADC), reference, biasing and clocking circuitry; and the digital circuit comprises a quadrature amplitude modulation (QAM) demodulator.

According to one embodiment of the present invention, a process implemented on an integrated circuit, the process includes asserting an initialization signal during powering up of the integrated circuit; generating a control signal; and providing a first voltage to a digital circuit of the integrated circuit when the initialization signal is asserted and providing a second voltage to the digital circuitry according to the control signal when the initialization signal is not asserted.

According to one embodiment of the present invention, the process further includes reducing a variation of a voltage, due to at least one of manufacturing process, temperature, power supply voltage to the integrated circuit, using a load simulator.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION OF THE FIGURES

Figure 1:
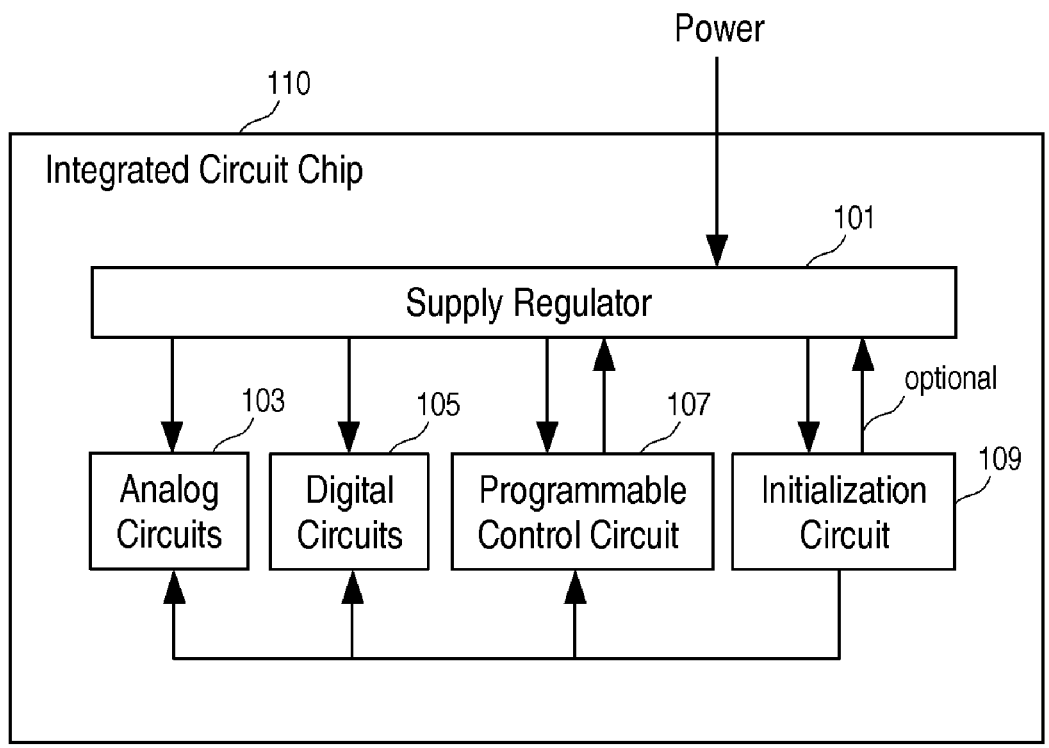
FIG. 1 shows an integrated circuit chip with a supply regulator according to one embodiment of the invention.

The following description and drawings are illustrative of the invention and are not to be construed as limiting the invention. Numerous specific details are described to provide a thorough understanding of the present invention. However, in certain instances, well-known or conventional details are not described in order to avoid obscuring the description of the present invention. References to one or an embodiment in the present disclosure are not necessarily references to the same embodiment; and, such references mean at least one.

One embodiment of the invention provides a power supply scheme for multi-supply integrated circuits, in which a single chip contains an integrated supply regulator with power-up initialization and programmability.

One embodiment of the invention uses on-chip power supply regulators to provide multiple power supply voltages to an integrated circuit. When an on-chip power supply regulator is used, the pin count of the integrated circuit can be reduced through reducing the number of power supply voltages to an integrated circuit. When an off-chip power supply regulator used to provide multiple power supply voltages is replaced with an on-chip power supply regulator, the board level circuit design can be simplified.

Further, in one embodiment of the invention, an on-chip power supply regulator can be used to adjust the power voltages supplied to the digital circuits on an integrated circuit chip. The speed of circuits, such as digital circuits, can be improved through increasing the power supply voltages. The power consumption of the circuits, such as digital circuits, can be reduced through reducing the power supply voltages. Thus, the performance of the digital circuit may be dynamically optimized through dynamically adjusting the supply voltages. Furthermore, adjusting supply voltages can be used in chip debugging or testing.

One embodiment of the invention uses an on-chip power supply regulator on an integrated circuit chip to provide multiple power supply voltages based on one power supply voltage provided to the integrated circuit chip. The integrated on-chip power supply regulator may be programmable to adjust one or more of the output voltages of the power supply regulator.

In one embodiment of the invention, a power-up initialization circuit is integrated on an integrated circuit chip with an on-chip supply regulator to control the initialization of the on-chip supply regulator and other circuits on the integrated circuit. Thus, the on-chip supply regulators have power-up initialization and programmability to provide adjustable, multiple supply voltages to the circuits on the integrated circuit, such as different supply voltages to digital circuit cores, analog circuits and/or I/O circuits.

Different portions of a mixed-signal integrated circuit may use different supply voltages. Mixed-signal integrated circuits combine analog and digital circuitry on the same chips. For example, many applications may be implemented with mixed-signal integrated circuits, such as the radio subsystem of a cell phone, the read data path and laser sled control logic of a DVD (Digital Video Disc or Digital Versatile Disc), or a receiver portion of a DTV (Digital Television) systems, etc. Some applications may be designed as a system-on-a-chip (SoC), which may include a microprocessor, digital signal processor (DSP), RAM and ROM.

FIG. 1 shows an integrated circuit chip with a supply regulator according to one embodiment of the invention. In FIG. 1, the initialization circuit (109) generates a signal to ensure proper power-up conditions for other portions of the integrated circuit chip (110); and the programmable control circuit (107) provides flexibility to adjust the supply voltages.

As shown in FIG. 1, the integrated supply regulator (101) on the integrated circuit chip (11) provides regulated supply voltages to various circuit blocks on the integrated circuit chip (110), such as analog circuits (103), digital circuits (105), programmable control circuit (107) and initialization circuit (109). The supply to 105, 107 and/or 109 can be shared in one embodiment.

In FIG. 1, the integrated circuit chip (110) receives a power supply voltage to power the supply regulator (101), which may generate multiple supply voltages and/or adjustable supply voltages.

In FIG. 1, the supply regulator (101) receives control and initialization signals from the control circuit (107) and the initialization circuit (109). The supply regulator (101) may receive the initialization signal from the initialization circuit (109) via the control circuit (107) or, optionally, from the initialization circuit (109) directly.

In FIG. 1, the programmable control circuit (107) is powered by the supply regulator; and the programmable control circuit (107) may adjust the supply voltage provided by the supply regulator (101) to power the programmable control circuit (107).

At power-up, the initialization block generates an initialization signal, which can be a pulse of certain width, to assert the proper start-up conditions for one or more blocks of circuits on the integrated circuit chip (110).

In FIG. 1, the supply regulator (101) and the programmable control circuit (107) are configured for proper initialization during power-up, to avoid the lock-up state or racing condition between the supply regulator (101) and the programmable control circuit (107). After the initialization, the supply regulator (101) is capable of adjusting the voltage output to the programmable control circuit (107), which is in turn capable of controlling the supply regulator (101) to change the voltage output.

For example, during the initialization period in which the initialization signal is asserted by the initialization circuit (109), the supply regulator can be configured to output a default voltage to the programmable control circuit (107) regardless the control signal received from the programmable control circuit (107). For example, the supply regulator can ignore the control signal from the programmable control circuit (107) when the initialization signal is asserted. Alternatively, when the initialization signal is asserted, the programmable control circuit (107) can be configured to generate a default control signal which causes the supply regulator (101) to provide a default voltage to the programmable control circuit (107). Thus, when the programmable control circuit (107) generates an invalid control signal during an initialization period, the supply regulator can still output a default voltage (or voltages) to the various circuit blocks to ensure appropriate initialization.

In one embodiment of the invention, the control circuit provides programmability for the supply regulator. For example, the programmable control circuit (107) can include a number of register bits. The output of the register bits can be changed to control the output voltage (voltages) of the supply regulators, after the initialization. The register bits are adjustable in real time, such that the integrated circuit chip (110) has the flexibility to trade off between the power and the speed of the chip. For example, the integrated circuit chip (110) may increase a supply voltage used in the digital circuits (105) to increase the speed of digital processing, or decrease the supply voltage used in the digital circuits (105) to reduce the power consumption for digital processing. The programmability can also be used during debugging and testing of the integrated circuit chip (110).

In one embodiment, the integrated circuit chip (110) may include a programmable clock generator (not shown in FIG. 1). The clock generator can be partially implemented using digital circuitry and partially implemented using analogy circuitry. In one embodiment, at least one of the output voltages of the regulator is controlled by the digital block from the programmable clock generator, while the clock generator is powered by the supply regulator.

In one embodiment, the on-chip supply regulator (101) is placed underneath the power bus surrounding the digital core to reduce the impact on die size.

Figure 2:
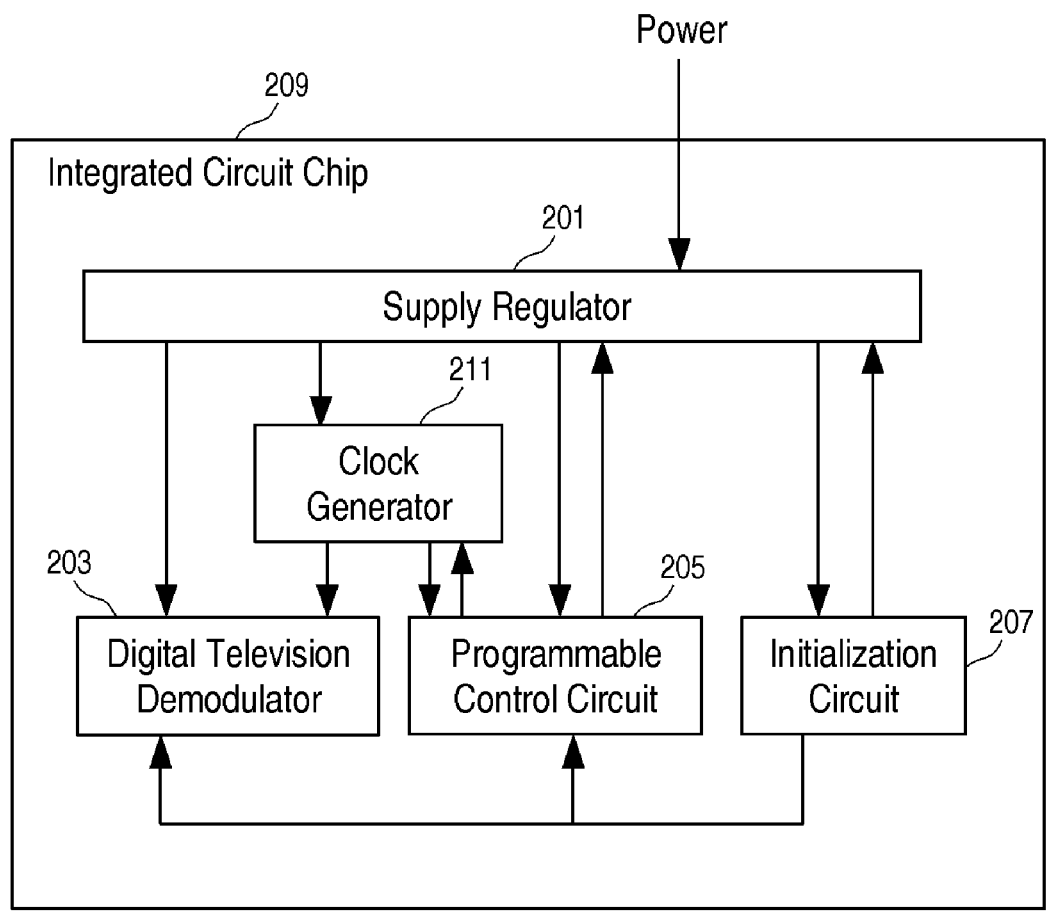
FIG. 2 shows an integrated digital television demodulator according to one embodiment of the invention.

FIG. 2 shows an integrated digital television demodulator according to one embodiment of the invention. In FIG. 2, the digital television demodulator (203) includes analog circuits and digital circuits integrated on the integrated circuit chip (209). The supply regulator (201) provides regulated power supply voltages to the digital television demodulator (203), a clock generator (211), a programmable control circuit (205) and an initialization circuit (207). The control circuit (205) is programmable to control the clock generator (211) and the supply regulator (201). The control circuit (205) is programmable to adjust the frequency of the clock signal generated by the clock generator (211) and the voltage supplied from the supply regulator (201). The control circuit (205) is powered by the supply regulator (201) and clocked according to the clock signal from the clock generator (211). When the initialization signal is asserted by the initialization circuit (207), the supply regulator (201) generates a default supply voltage to the clock generator (211); and the clock generator (211) generates a clock signal at a default frequency. When the initialization signal is not asserted, the clock signal can be used to adaptive control the supply regulator to adjust the regulated supply voltages from the supply regulator (201) and or the frequency of the clock signal generated by the clock generator (211)

In one embodiment, the digital television demodulator (203) includes a digital circuit and an analog circuit. The digital circuit of the digital television demodulator (203) is implemented using complementary metal oxide semiconductor (CMOS) logic. The power supply regulator provides different voltages to the digital circuit and the analog circuit of the digital television demodulator (203). In one embodiment, the voltage to the digital circuit can be lower than the voltage to the analog circuit of the digital television demodulator (203). The supply regulator (201) provides the different voltages to the digital circuit and the analog circuit, based on same power voltage input to the integrated circuit.

In one embodiment, the digital television demodulator (203) includes a quadrature amplitude modulation (QAM) demodulator; and the analog circuit includes a gain amplifier, Analog to Digital Converter (ADC), reference, biasing and clocking circuitry.

Figure 3:
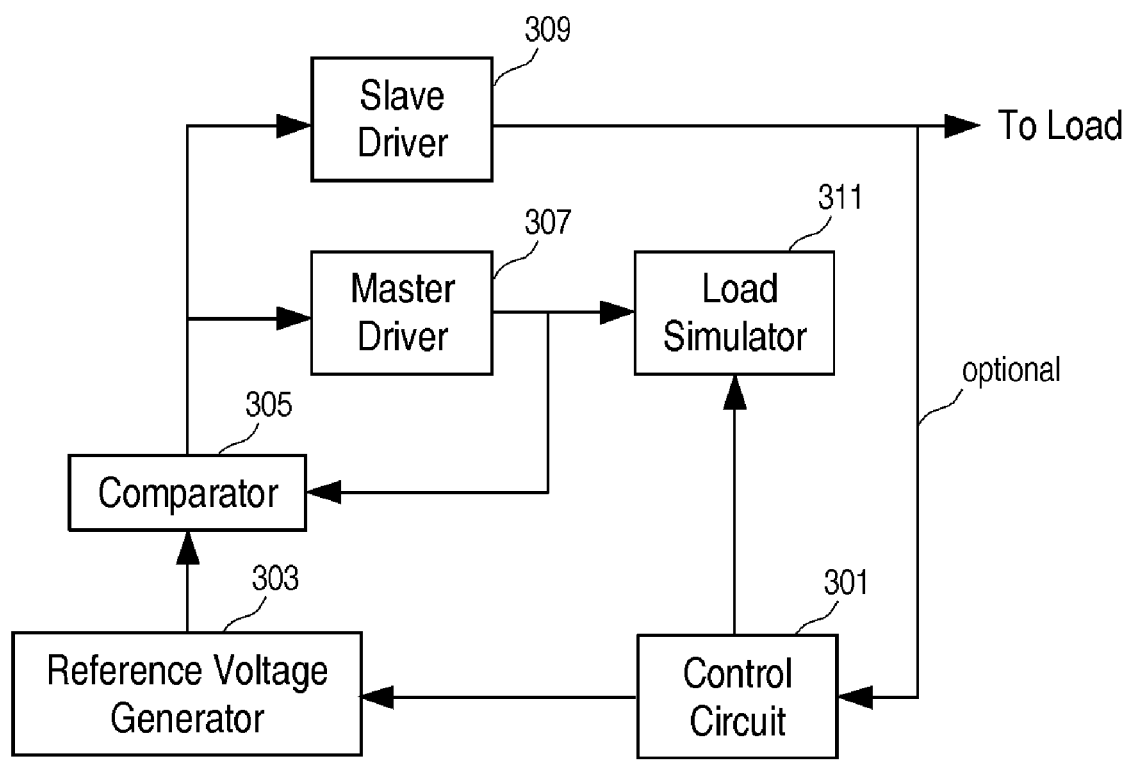
FIG. 3 shows a portion of a supply regulator and a control circuit according to one embodiment of the invention.

FIG. 3 shows a portion of a supply regulator and a control circuit according to one embodiment of the invention. In FIG. 3, a reference voltage generated by the reference voltage generator (303) is provided to a comparator (305).

The comparator (305) generates a control signal to control the master driver (307) and the slave driver (309), based on the difference between the output of the reference voltage generator (303) and the output of the master driver (307). The same control signal from the comparator (305) is used in both the slave driver (307) and the master driver (309), such that the output of the slave driver (309) tracks the output of the master driver (307).

The control signal generated by the comparator (305) is used to minimize the difference between the output of the reference voltage generator (303) and the output of the master driver (307). Thus, the output of the master driver (307) tracks the reference voltage; and the output of the slave driver (309) tracks the output of the master driver (307).

In FIG. 3, the master driver (307) drives a load simulator (311), which simulates certain aspects of the load that is driven by the slave driver (309). The load simulator (311) is implemented on the same integrated circuit chip as the circuit that is driven by the slave driver (309), such that the variations in working frequency, data transition pattern, fabrication process and working temperature, etc., are reflected on the load simulator. The use of the load simulator greatly reduces the variation of the output voltage of the slave driver (309) due to process, temperature and supply voltages (PVT).

Due to variation of process, temperature and supply voltages (PVT), there can be large variations of the average current drawn from the regulator. To maintain a well-controlled output voltage in a traditional way would require a very small output impedance of the regulator at low frequency. The use of the load simulator in FIG. 2 eliminates the need to increase width-to-length ratio of the MOS device. In one embodiment, through using the load simulator to track the real load with PVT variations and programmability, the integrated circuit chip does not need to have a very low output impedance at low frequency.

In one embodiment, the load simulator is implemented using a number of digital gates similar to the digital circuit that is driven by the slave driver (309). In one embodiment, the load simulator is implemented using an clocked digital gates.

In FIG. 3, an optional feedback can be derived from the output of the slave driver (309) via the control circuit (301). Such a feedback can be used to further reduce mismatch between the master and slave driver.

The control circuit (301) can adjust the output of the reference voltage generator (303) and the load simulator (311) to adjust the output of the slave driver.

Figure 4:
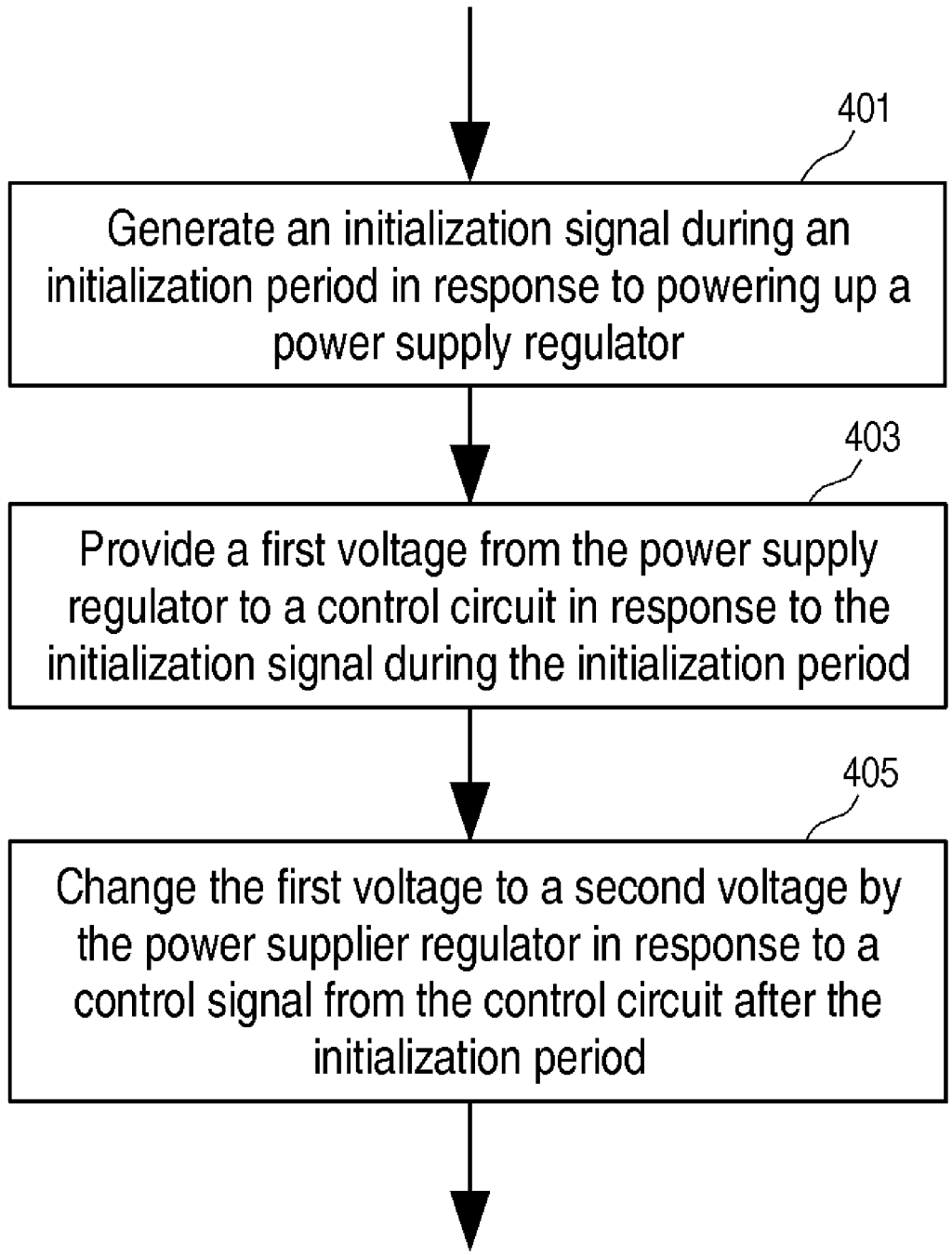
FIG. 4 shows a process implemented on an integrated circuit chip according to one embodiment of the invention.

FIG. 4 shows a process implemented on an integrated circuit chip according to one embodiment of the invention. In FIG. 4, an initialization signal is generated (401) during an initialization period in response to powering up a power supply regulator. A first voltage is provided (403) from the power supply regulator to a digital circuit of the integrated circuit chip, including a control circuit, in response to the initialization signal during the initialization period. The first voltage for the digital circuit is changed (405) to a second voltage by the power supply regulator in response to a control signal from the control circuit after the initialization period.

Thus, at least one embodiment of the invention provides a power supply scheme for integrated circuits that use multiple supply voltages (multi-supply ICs), in which a programmable supply regulator is integrated on the ICs. In one embodiment, the on-chip supply regulator has power-up initialization and programmability and provides a means to adjust the speed/power of the circuits running under multiple regulated supply voltages.

Integration of supply regulators on integrated circuit chips can eliminate the use of off-chip power regulators and, thus, reduce the pin counts and the Bill of Material (BOM) at the board level.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An integrated circuit, comprising:
    an initialization circuit to assert an initialization signal during powering up of the integrated circuit;
    a control circuit coupled to the initialization circuit; and
    a power supply regulator coupled to the control circuit, the power supply regulator to provide a first voltage to the control circuit when the initialization signal is asserted, the power supply regulator to provide a second voltage to the control circuit according to a control signal from the control circuit when the initialization signal is not asserted.

2. The integrated circuit of claim 1, wherein the integrated circuit is implemented on a single chip.

3. The integrated circuit of claim 2, further comprising:
    a digital television demodulator.

4. The integrated circuit of claim 3, wherein the digital television demodulator comprises a digital circuit and an analog circuit.

5. The integrated circuit of claim 4, wherein the digital circuit is implemented using complementary metal oxide semiconductor (CMOS) logic.

6. The integrated circuit of claim 4, wherein the power supply regulator provides one voltage to the digital circuit and one voltage to the analog circuit.

7. The integrated circuit of claim 6, wherein the voltage to the digital circuit is lower than the voltage to the analog circuit.

8. The integrated circuit of claim 6, wherein the voltage to the digital circuit is adjustable according to a control signal from the control circuit.

9. The integrated circuit of claim 8, wherein the control circuit is a digital circuit.

10. The integrated circuit of claim 1, further comprises a clock generator.

11. The integrated circuit of claim 10, wherein when the initialization signal is not asserted, the power supply regulator changes the first voltage to the second voltage.

12. The integrated circuit of claim 1, wherein the power supply regulator comprises:
    a load simulator;
    a master driver to provide a voltage to the load simulator;
    a comparator to generate a control signal based on a difference between a reference voltage and the voltage to the load simulator, wherein the reference voltage is under the control of the control logic;
    a slave driver to provide an output voltage;
    wherein the control signal from the comparator controls the master driver and the slave driver.

13. The integrated circuit of claim 12, wherein the load simulator comprises at least one digital gate.

14. The integrated circuit of claim 13, wherein the reference voltage is generated on the integrated circuit.

15. An integrated circuit, comprising:
    means for asserting an initialization signal during powering up of the integrated circuit;
    means for generating a control signal;
    means for providing a first voltage to generate the control signal when the initialization signal is asserted and providing a second voltage according to the control signal when the initialization signal is not asserted.

16. The integrated circuit of claim 15, wherein the integrated circuit is implemented on a single chip; and the control signal is programmable to adjust a voltage provided to generate the control signal.

17. The integrated circuit of claim 15, further comprising:
    means for reducing a variation of a voltage to a digital circuit on the integrate circuit and a voltage to an analog circuit on the integration circuit.

18. The integrated circuit of claim 17, wherein the analog circuit comprises a gain amplifier, Analog to Digital Converter (ADC), reference, biasing and clocking circuitry; and the digital circuit comprises a quadrature amplitude modulation (QAM) demodulator.

19. A process implemented on an integrated circuit, the process comprising:
    asserting an initialization signal during powering up of the integrated circuit;
    generating a control signal; and
    providing a first voltage to a digital circuit of the integrated circuit when the initialization signal is asserted and providing a second voltage to the digital circuit according to the control signal when the initialization signal is not asserted.

20. The process of claim 19, further comprising:
    reducing a variation of a voltage, due to at least one of manufacturing process, temperature, power supply voltage to the integrated circuit, using a load simulator.

* * * * *